INVENTORS.
FREDERICK WILLIAM STEWART
MATTHEW JAMES KELLY
BY ASHLEY J. REEK
ATTORNEY

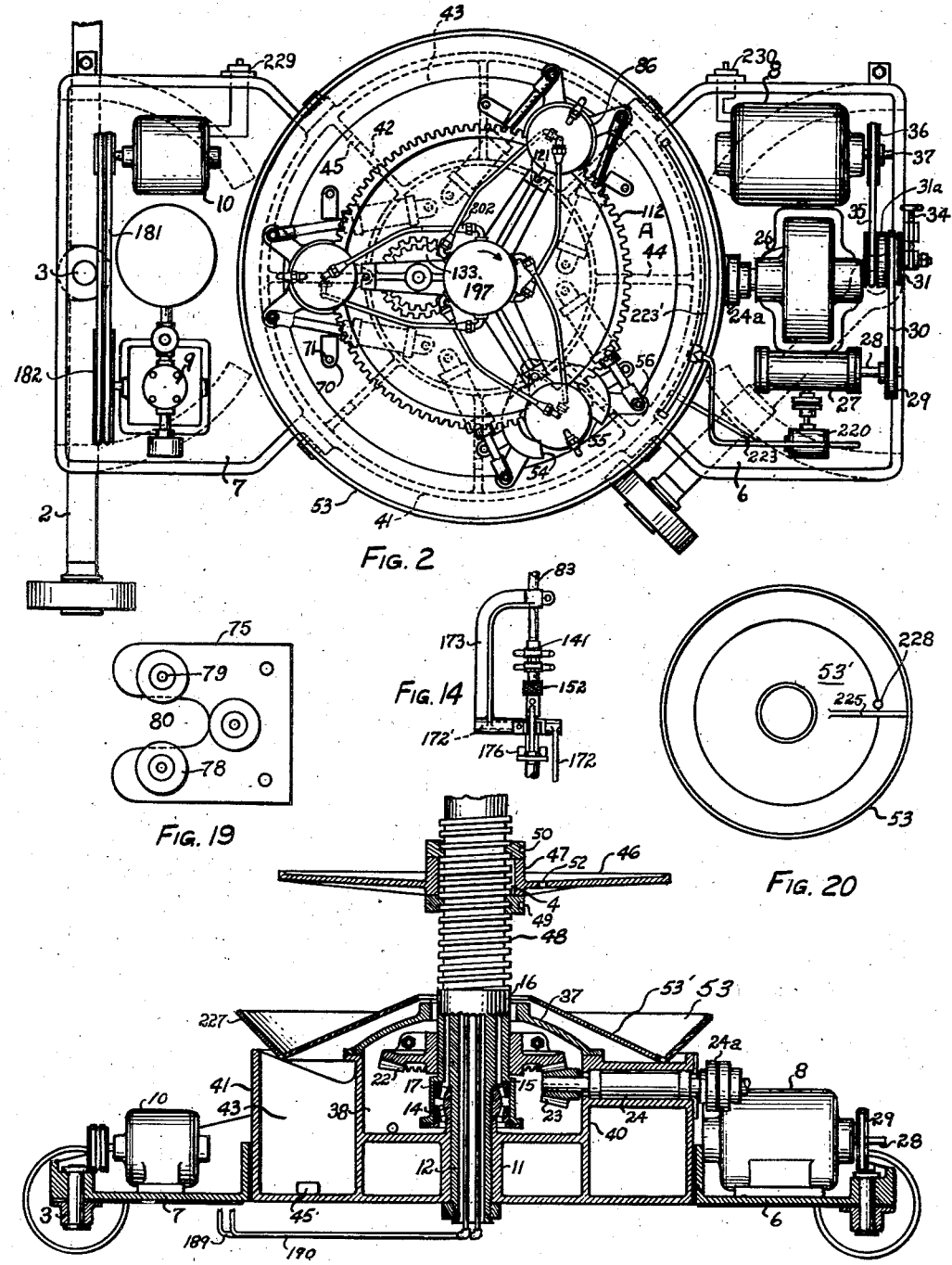

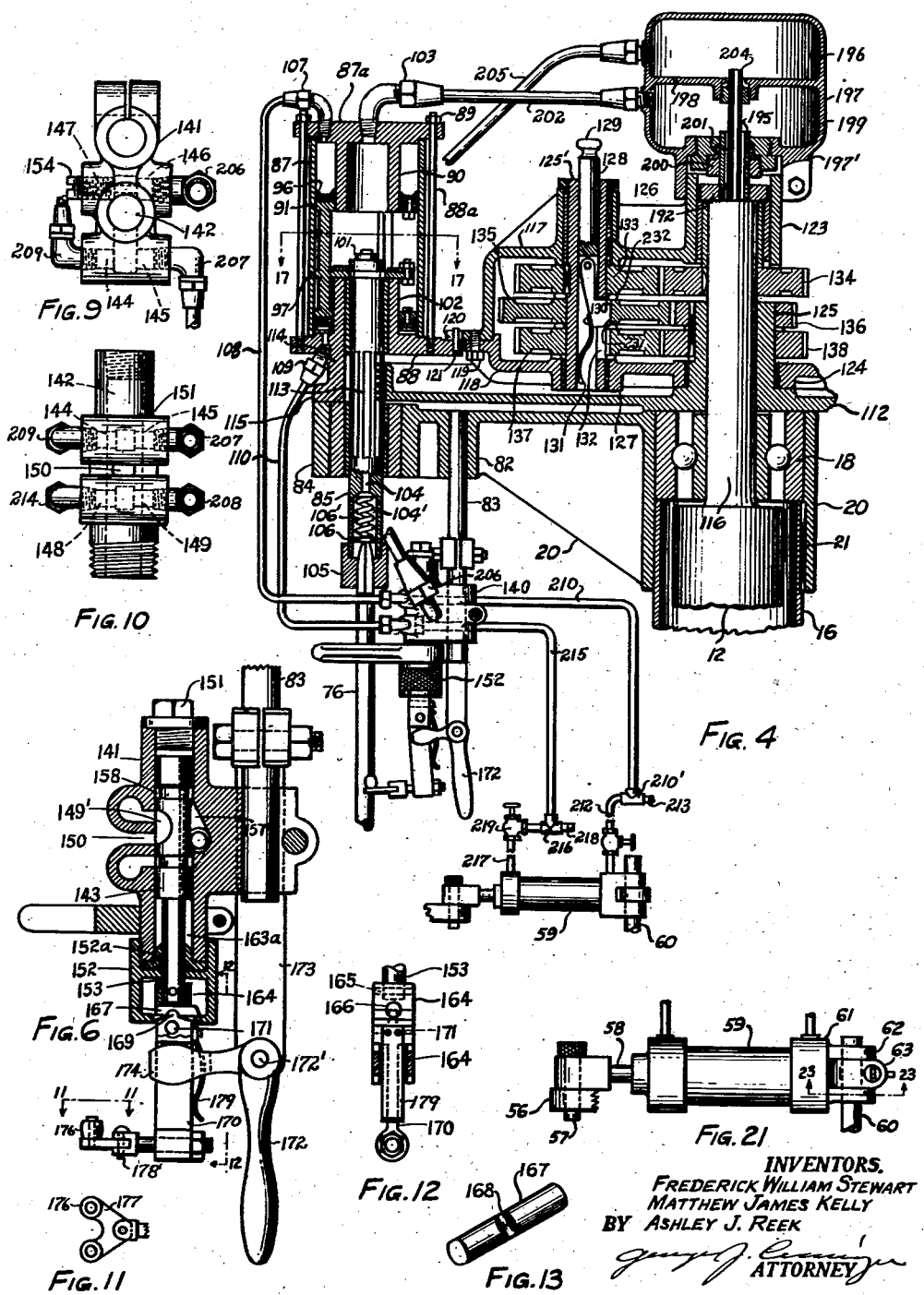

Sept. 7, 1943.    F. W. STEWART ET AL    2,329,012
METHOD AND APPARATUS FOR MANUFACTURING GLASSWARE
Filed May 1, 1940    5 Sheets-Sheet 4
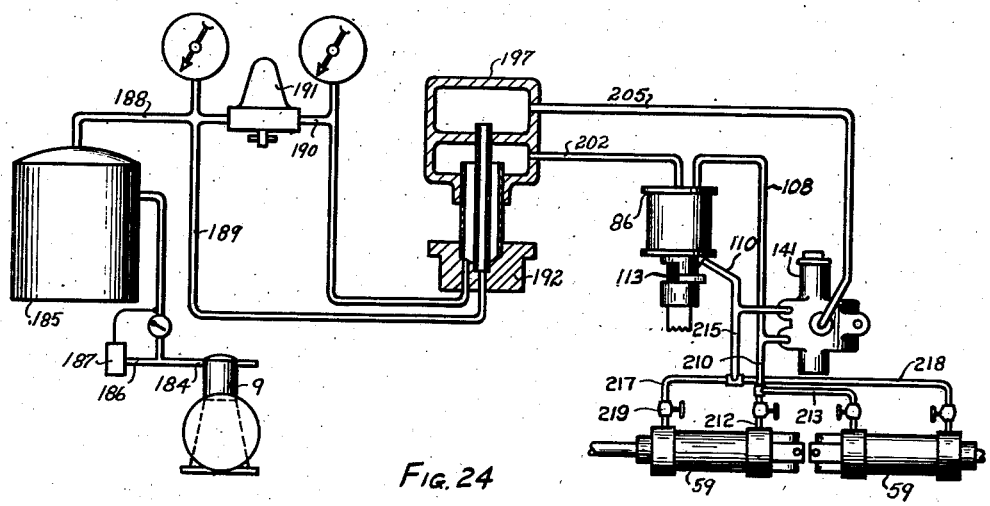
Fig. 24
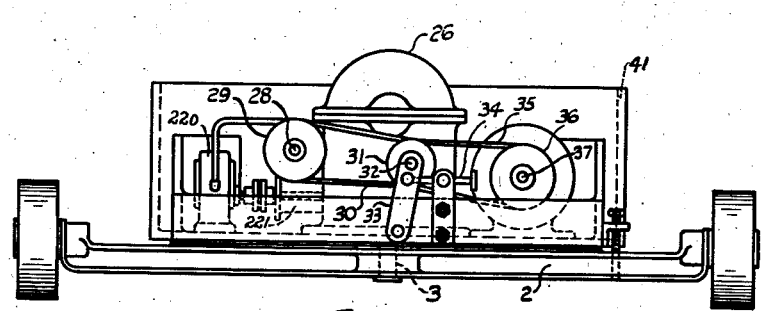
Fig. 5
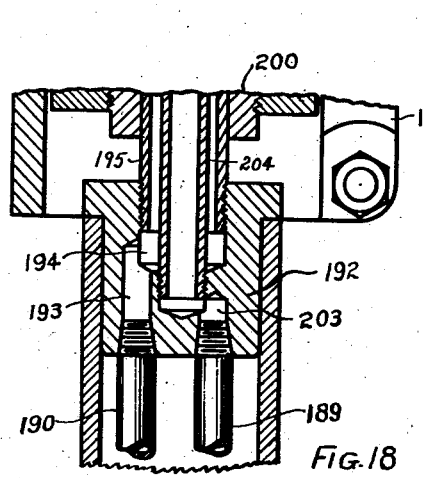
Fig. 18
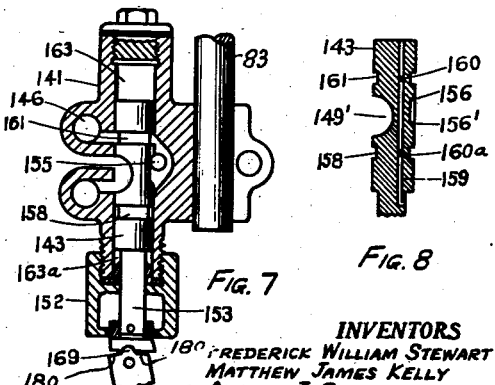
Fig. 7
Fig. 8
INVENTORS
FREDERICK WILLIAM STEWART
MATTHEW JAMES KELLY
BY ASHLEY J. REEK
ATTORNEY Sept. 7, 1943.   F. W. STEWART ET AL   2,329,012
METHOD AND APPARATUS FOR MANUFACTURING GLASSWARE
Filed May 1, 1940   5 Sheets-Sheet 5

INVENTORS
FREDERICK WILLIAM STEWART
MATTHEW JAMES KELLY
BY ASHLEY J. REEK
ATTORNEY

Patented Sept. 7, 1943

2,329,012

UNITED STATES PATENT OFFICE 2,329,012

METHOD AND APPARATUS FOR MANUFACTURING GLASSWARE

Frederick William Stewart, Weston, and Matthew James Kelly, Elkins, W. Va., and Ashley J. Reck, Carrick, Pa., assignors to Kelly Foundry and Machine Company, Elkins, W. Va., a corporation of West Virginia Application May 1, 1940, Serial No. 332,662

15 Claims. (Cl. 49—19)

This invention relates to methods and apparatus for the manufacture of glassware. It has to do particularly with a paste mold machine wherein the molds are mounted on a rotatable table, the blow pipes being placed on and removed from the machine by hand, or automatically if desired.

One object of this invention is to provide a machine of the class described capable of making better quality ware with fewer rejects, said machine being of simplified design and construction.

Another object of this invention is to provide a simplified drive system in a machine of this class having easily accessible controls and adjustments, also a simplified and reliable epicyclic gear train arrangement for selective speed rotation of the blow pipe chuck shaft adjustable whilst the machine is in operation.

Another object is to provide a simplified but efficient compressed air system for operating the blow pipe chucks, opening and closing the molds and blowing, said system including a single means having certain novel features of construction and operation for controlling various operations.

Another object is to provide in a machine of this class a self-contained compressed air system complete with compressor, tank, reducing valves for high and low pressure air together with air distributing provisions.

Another object of this invention is to provide a novel form of blow head by means of which the blow pipe chuck shaft is entirely free of any mechanical connection with fluid supply lines and therefore may be raised, lowered and rotated without fear of twisting off such connections, a common fault in machines of this class built heretofore.

Another object is to provide in a machine of the class described, means enabling the establishment of a connection between the blow pipe and the source of blowing air without imposing appreciable mechanical pressure on the blow pipe and thereby reducing wear on the blow pipe rest.

Another object of this invention is to eliminate the need for packing glands around the blow pipe chuck shaft thereby avoiding possible leakage and the need for frequent repacking.

Another object is to provide an improved mold cooling system, said system being substantially closed and self contained, the equipment necessary to the operation thereof being built into and transportable with the machine.

Another object is to provide in a mold cooling system means enabling an increase in the amount of heat dissipated thereby increasing the capacity of the system for cooling purposes. Another object is to provide for the settling out of sediment and other foreign matter which might otherwise clog the supply lines and spray heads or mark the ware if sprayed thereon.

Another object is to provide means enabling the quick exchange and replacement of molds and the repositioning or replacement of actuating cylinders therefore. Another object is to provide for variation in the opening and closing speeds of individual mold sections. Another object is to provide adjustable means for predetermining the maximum clearance between mold halves when in open position.

A further object is to provide an organized substantially self contained machine complete with operating equipment, said machine being mounted on a mobile frame capable of being turned in a short radius and maneuvered by hand.

Other objects and advantageous features will be noted in the following detailed description and accompanying drawings wherein like characters of reference designate corresponding parts and wherein:

Figure 2 is a top plan view of the machine of Figure 1.

Figure 3 is a vertical section through the lower portion of the machine.

Figure 4 is an enlarged vertical section through the top of the machine.

Figure 5 is a view of the right hand side of the machine base.

Figure 6 is a sectional elevation of the manual control mechanism for high pressure air used in opening and closing the molds and vertically reciprocating the blow pipe chuck shaft.

Figure 7 is a sectional elevation of the mechanism shown in Figure 6 with the piston in another position of adjustment.

Figure 8 is a sectional elevation of the piston.

Figure 9 is a plan view of the valve housing of Figure 6.

Figure 10 is a front view of the housing of Figure 9.

Figure 11 is a view taken in the direction of the arrows 11—11 of Figure 6.

Figure 12 is a detail taken in the direction of arrows 12—12 of Figure 6.

Figure 13 is a detail of a latching pin.

Figure 14 is a front elevation of the mechanism of Figure 6 including the mounting bracket.

Figure 18 is a detail in enlarged vertical section showing how the high and low pressure air lines are connected to the distributor.

Figure 19 is a plan view of the blow pipe rest.

Figure 20 is a plan view of the drip pan.

Figure 21 is a detail showing one of the mold actuating cylinders.

Figure 24 is a piping diagram of the compressed air system.

Machine frame and drive

Figure 1:
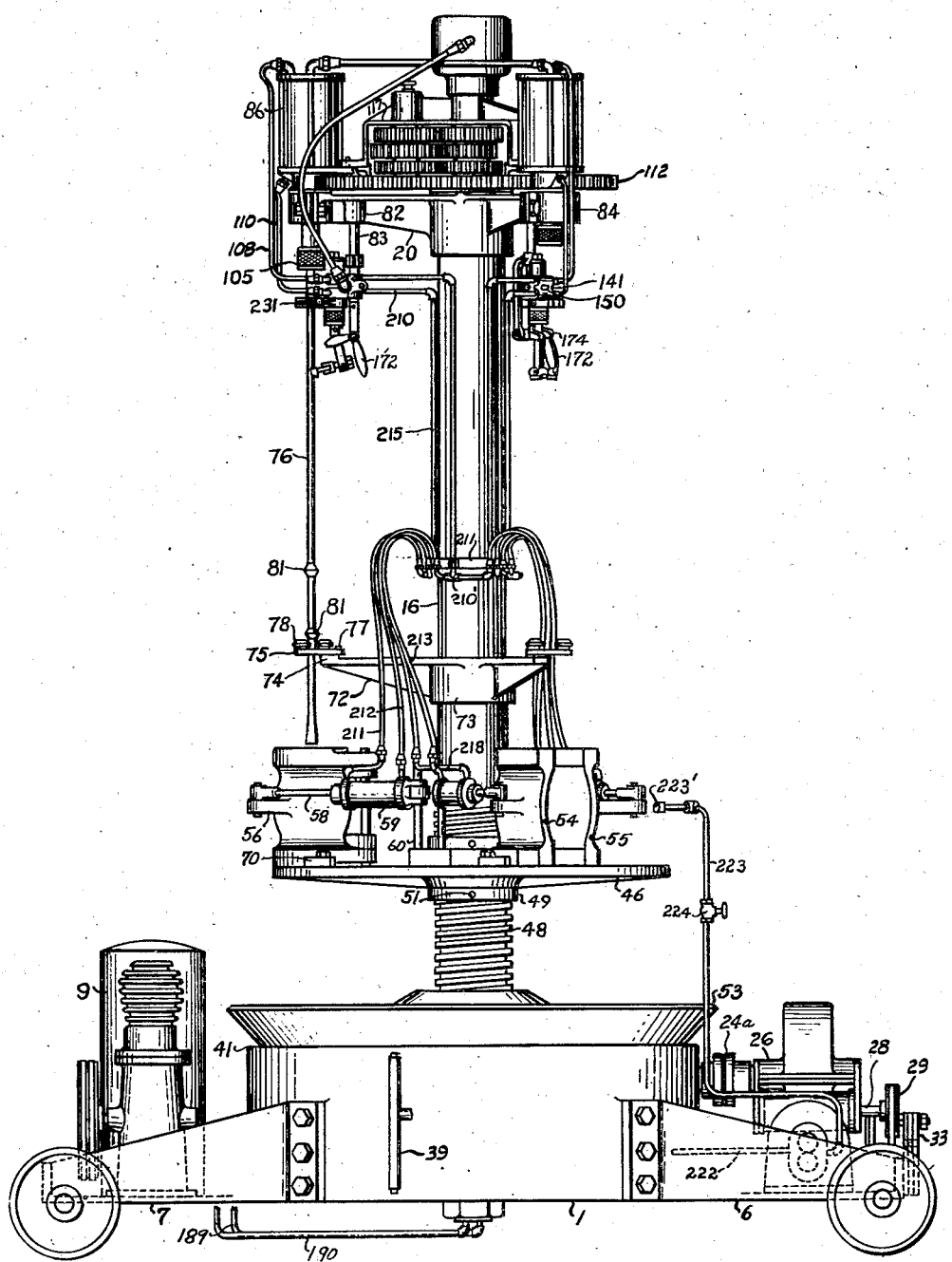
Figure 1 is an elevation of the preferred form of paste mold glass machine comprising this invention.
Figure 16:
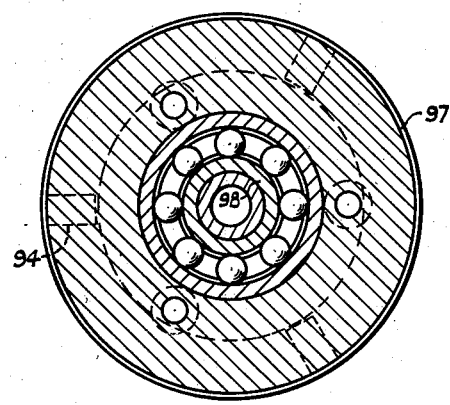
Figure 16 is a section taken on line 16—16 of Figure 15.
Figure 17:
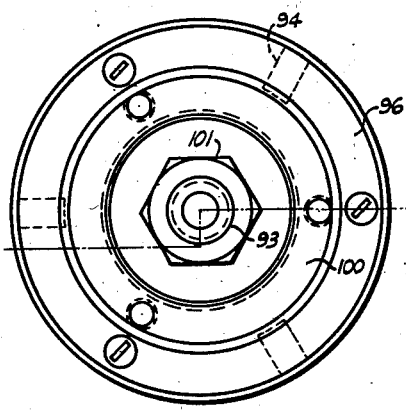
Figure 17 is a horizontal section taken on line 17—17 of Figure 4.

The numeral 1 designates the base of the machine shown as a wheeled truck, with axles 2 mounted on center pivots 3 so that the machine may be turned on a short radius and moved from one location to another. A locking pin is provided for each axle which must be withdrawn before either can be swivelled. The base is formed with a compartmented center section and right and left aproned platforms 6 and 7 respectively, Figures 1, 2 and 3, the drive motor 8 and associated drive mechanism being mounted on platform 6 and the air compressor 9, motor 10 and other apparatus associated therewith mounted on platform 7 to be described in detail hereinafter.

Said base is provided with an axial vertically disposed hub 11 in which is fixed a hollow vertical standard 12, Figure 3, with a spherical antifriction bearing 14 thereon resting on top of hub 11. An annular shoulder 15 on standard 12 bears against the bearing and the entire assembly is tightened down by nut 13 on the threaded lower end of standard 12. The bearing 14 rotatably supports a hollow column 16 having an annular enlargement 17 which fits over the outside of the bearing, said standard extending above the column as shown in Figure 4. The spherical bearing will permit 4° deflection of the column from the vertical.

At its upper end the column 16 supports an anti-friction bearing 18 and resting thereon in telescoping relation therewith is the hub 19 of a spider 20, Figures 1 and 4, on which the blow heads are mounted. 21 is the key which insures the spider rotating with the column 16 and it is inserted in contiguous key slots formed in the hub and column.

Near the bottom of the column 16 and around the perimeter thereof is an annular gear 22, Figure 3, which meshes with a drive pinion 23 on driven shaft 24 journaled in housing 25 whereby the column is rotated. 26, Figure 2, designates a housing enclosing compound reduction gearing to which shaft 24 is connected by coupling 24a and in housing 27 is a worm gear having a worm shaft 28, Figure 5, on which a pulley 29 is mounted driven by belt 30. 31 is the three part double groove pulley, Figure 2, of a speed reducer, the pulley being mounted on a shaft 32 supported by a pivoted lever 33, the angular position of which is adjusted by screw 34. Belt 30 seats in the right hand groove of pulley 31, Figure 2, and belt 35 connected to pulley 36 on motor shaft 37 is seated in the left hand groove. By changing the angular position of lever 33, one belt is tightened and the other loosened, the depth of the grooves being varied automatically due to a center section 31a of pulley 31 being shiftable on shaft 32.

As indicated by arrows in Figure 2, the direction of rotation of column 16 is clockwise.

A fluid tight cover 37, Figure 3, closes an oil compartment 38 surrounding the spherical bearing 14, gear 22 and pinion 23. Said compartment is filled with oil through externally located pipe 39, Figure 1. The pipe has a drain plug at the lower end. Surrounding the wall 40 of this compartment and spaced therefrom is an annular upstanding flange 41 having radially extending vertical webs 42 spaced at 45° which are joined to the wall 40 thereby forming a series of open top compartments 43. Each web, except web 44, has a centrally located opening 45 therethrough near the floor of the compartment thereby connecting adjacent compartments and enabling cooling fluid to pass from one to the other as will later be described in detail.

The mold table 46 is the circular mold table, Figure 3, provided with an axial hub 47 which fits over column 16, said table being rotatable therewith. The column is threaded externally at 48 and both the table and column have contiguous key slots in which key 4 is located. The table is vertically adjustable on the column by means of screw collars 49 and 50 which are screwed on the column 16 beneath and above the table respectively. Radial sockets 51 are provided in each collar for the insertion of a tool for rotating and tightening the collars.

The table is provided with one or more holes 52 for draining sprayed water into an annular drip pan 53 therebelow, the surface of the table sloping slightly toward the center where the holes are positioned.

The table of the machine has three molds located on 120° centers as will be noted in Figure 2. These molds are made in separable sections 54 and 55 respectively and the molding cavity which is formed when the sections are closed may be of any desired contour to suit production requirements. Also the number of molds utilized is not limited to three in number and may be increased within practical limits. Since the molds and actuating mechanism are identical in each instance, with possibly the exception of the molding surface contour, a description of one will suffice for all.

Figure 22:
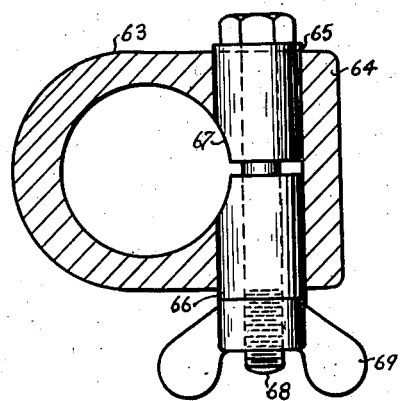
Figure 22 is a detail in section of a clamp for locating said piston and cylinder of Figure 21 vertically on the post.
Figure 23:
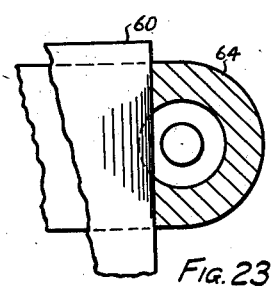
Figure 23 is a section taken on line 23—23 of Figure 21.

Each mold section has a projecting apertured lug 56 pivotally connected by a hinge pin 57 with the projecting end of a piston rod 58 associated with an air cylinder 59. Said air cylinder is mounted on a vertical pivot post 60 secured to the table. As shown in Figures 21, 22 and 23 the rear cap 61 of the air cylinder has a pair of vertically spaced lugs 62 having aligned apertures.

Quick repositioning or replacement, if exchanging cylinders and molds, is facilitated by the provision of a ring 63 fitted between the lugs when mounted on the post 60. Said ring has a bore in a portion 64 in which are located two hollow bushings 65 and 66 one on each side of the post, each bushing having "spots" 67 formed therein corresponding to the radius of curvature of the post. 68 is a headed bolt which projects through the bushings and has a wing nut 69 for tightening purposes.

When said nut is drawn down, the bushings are forced into clamping relation with the post thereby preventing vertical displacement of the air cylinder but permitting horizontal swinging motion on the post. The bushings relax their grip on the post immediately the pressure is relieved by unscrewing the wing nut. There is no wedge to stick up or necessitate breaking out, hence no delay in shifting the cylinder to another position.

Mold stops 70, Figures 1 and 2, secured to the table by bolts 71 are capable of adjustment on the bolts to predetermine the maximum distance to which the mold sections may be swung open, if desired. A series of holes may also be drilled and tapped in the surface of the table so that the stops may be moved to different positions to accommodate different size molds.

The blow pipe rest and blow pipe 72 designates a spider, Figure 1, with three or more radial arms, the number depending on the number of molds being operated but here shown as three, said arms being spaced 120° apart same as the molds. The spider has a central hub 73 mounted on the column 16, Figure 1, and is keyed thereto being rotatable therewith. The extremity of each arm provides a rest 74 supporting a slotted plate 75, Figure 19, secured thereto by bolts 77. 78 are tapered rollers spaced at 120° on radially equidistant vertical pivots 79 positioned around and perimeter of the arcuate portion of the slot 80, said slot being open to permit insertion and withdrawal of the blow pipe 76. When the plate 75 is properly adjusted the rollers are centered about the vertical axis of the mold forming a rest for the blow pipe.

Each blow pipe has two external enlargements 81 spaced one above the other. Said enlargements are preferably in the form of downwardly tapered circumferential flanges one or the other of which rests on the rollers 78 when the blow pipe is in blowing position depending on the height of the mold. The lower ends of the blow pipes are flared in the customary manner to engage the gather of glass, and the upper ends are hexagon shaped, see Figure 4, to correspond with the socket in the blow pipe chuck.

The blow head

Since all blow heads are identical in construction and operation only one thereof will be described in detail. With reference to Figures 1 and 4, 82 is an enlargement at the outer end of each arm of the spider 20, bored vertically to receive a rod 83 having a press fit therein on which the blow head control mechanism is mounted, this to be later described in detail. Each arm of spider 20 has a split clamp holder 84 at the outer extremity, said clamp non-rotatably embracing the cylindrical extension 114 of the bottom closure 88 of a blow head 86.

The blow pipe chuck shaft 85 reciprocates and rotates in this cylindrical extension which is sleeved as at 111. The pipe is held in axial alignment with the vertical axis of the mold chuck with which it is associated.

86 is the blow head of which there are three shown, one supported by each of the arms of spider 20. The blow head, Figures 4, 15, 16 and 17, consists of a cylindrical sleeve 87 provided with end closures 87a and 88 clamped in air tight sealing relation therewith by tie bolts 88a screwed into the lower closure and provided with nuts 89 holding the upper closure securely against vertical displacement.

Closure 87a has a centrally located inwardly projecting annular hollow hub 90 which extends about one third the way into the piston chamber. This hub is hollow and the wall of the closure 87a is drilled centrally and tapped for the reception of a threaded air line connection 103 by means of which low pressure blowing air is supplied thereto. Concentric with hub 90 but spaced therefrom and inverted relative thereto is a hub 102, also hollow and of equal diameter and length, said hub being formed as a part of the lower closure 88.

Figure 15:
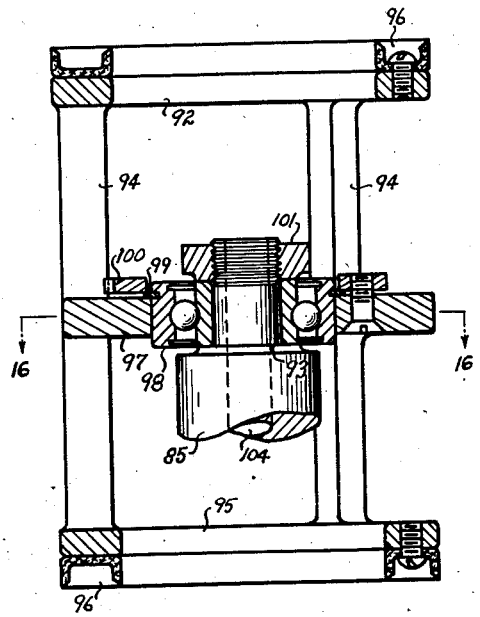
Figure 15 is a detail, partly in section, of the blow head piston.

91, Figure 15, is a piston which supports the blow head chuck shaft and is adapted to reciprocate in said cylindrical sleeve. Said piston comprises an apertured ring 92 to which is joined and from which depend three vertical ribs 94 on 120° centers having a similar ring 95 joined to the lower ends thereof concentric with the upper ring. Each ring has a circular gasket 96 U-shaped in cross section secured thereto, the top gasket facing upwards and the lower downwards, thereby sealing the space between the inside of the sleeve 87 and the perimeter of hubs 90 and 102 above and below said piston from communication with the space inside the piston.

In the vertical center of the piston is a third ring 97 with a smaller aperture, said ring being joined to the aforesaid ribs. Upwardly through the aperture projects the reduced and partly threaded end 93 of the hollow chuck shaft and secured thereon by nut 101 is an annular anti-friction bearing 98, Figures 15 and 17, having a circumferential groove in the outer race in which a ring 99 forming a circular flange is located. Said flange rests on the top of ring 97, the major portion of the length of the bearing being suspended in the aperture and vertically supporting hollow shaft 85, which projects downwardly below extension 114 and is rotatable in hub 102 and extension 114 both having shaft bushings therein. 100 is a ring plate which is bolted to ring 97 clamping flange 99 firmly in place. This prevents radial and vertical displacement of the bearing whilst permitting shaft 85 to rotate. The outer race of course does not rotate.

By virtue of this construction the blow pipe chuck shaft has no mechanical connection with the air inlet connection 103 and is free to reciprocate and rotate relative thereto without danger of any connections being twisted off. Furthermore the load on the bearing is negligible and it will give long trouble free operation. The gaskets 96 effectively prevent leakage into the piston chamber and insure that blowing air will pass through hub 90 and down through hollow chuck shaft 85, passage 104, spring chamber 104' and chuck 105 into the blow pipe when said pipe is in position shown in Figure 4.

The chuck 105 is screwed on chuck shaft 85 and preferably locked with a set screw. Said chuck has a hexagon socket to fit the blow pipe and rotate the same. The blow pipe does not wedge in the socket but has a sliding fit therein. The tip of the blow pipe is tapered and when the pipe is in operating position, Figure 4, said tip projects upwardly into the spring chamber 104' and into the aperture of a spring pressed sealing ring 106. This arrangement is fully capable of preventing leakage of the low pressure blowing air.

It will be noted that the tapered rollers 78 support only the weight of the blow pipe plus whatever negligible effort the spring 106' may impose thereon. No downward force is exerted on the blow pipe by the chuck 105. This construction relieves the tapered rollers and axis pins of undue wear and promotes long trouble free operation thereof.

107 is an inlet coupling connected to a high pressure supply line 108 admitting air under pressure to the zone of the cylinder above piston 91 for moving it downwardly to engage the chuck 105 with the upper end of the blow pipe. 109 is an inlet coupling also connected to a high pressure line 110 admitting air under pressure to the zone of the cylinder below the piston for elevating it and disengaging the blow pipe chuck and blow pipe. This will be later described in detail.

Mechanism for rotating the blow pipes

In the machine herein illustrated there is mechanism for accommodating three blow pipes. The blow pipe chuck shafts are rotated by a common gear 112. Each shaft is vertically splined as at 113, said spline teeth meshing with the teeth on gear 112. The lower closure 88 of the blow head cylinder has a bushed cylindrical extension 114 non-rotatably clamped in position there being an enlargement 115 resting on top the split clamp to help support the blow head particularly when the clamp is loosened or is being tightened. Said extension 114 is cut away on the side facing gear 112 the remainder being left intact thereby providing a dust and safety housing.

Gear 112 is mounted on the reduced hollow extension 116 of standard 12 and is rotatable relative thereto. Said gear is driven by an epicyclic gear train selectively adjustable to revolve the blow pipe chuck shaft at different speeds.

117 is the webbed upper section of a two part frame for supporting the epicyclic train, the lower half being numbered 118. Said frames are flanged and bolted together at 119, the upper frame flange having a bifurcation 120. A vertical pin 121 secured in an extension 122 of the lower closure 88 extends into the bifurcation. As the spider rotates about standard 12, thereby carrying the blow heads in a circular path about said standard the pin 121 provides the driving connection for rotating the frame 118—117.

The upper half 117 of the frame has an annular hub 123 formed integral therewith and this hub is sleeved around the reduced end 116 of standard 12 and is rotatable thereon. The lower half of the frame also has an annular hub 124 which is sleeved around the hub 125 of gear 112 and rotates thereon.

125' is a gear shaft journaled in aligned bearing housings 126 and 127 formed in the upper and lower frame members respectively, said shaft being hollow to accommodate a vertically movable shifting pin 128 extending above housing 126 and having a knobbed end 129. Pivotally secured to the bifurcated lower end of the pin is a gear shifting key 130 to which is attached a leaf spring 131 for biasing the key to the right, Figure 4, thereby causing the key to project through slot 132 in the shaft 125' and engage with the selected gear.

133 is the upper gear on shaft 125'. It is in engagement with and rotates relative to a fixed gear 134 keyed on the reduced end 116 of stationary standard 12, thereby rotating shaft 125' to which it is keyed when spider 20 rotates the gear frame. 135 is the gear rotated by shaft 125' in the illustration said gear not being permanently keyed to the shaft. 136 is the gear rotated by gear 135, said gear 136 being mounted on and keyed to the hub 125 of gear 112. This in turn establishes a driving connection with gear 112 to thereby rotate the blow pipe chuck shaft. Gear 137 is representative only of another speed to which the mechanism may be shifted, said gear having a driving connection with gear 112 through gear 138 keyed on hub 125. It will be noted that with the gear system illustrated, the blow pipe chuck shaft may be rotated in either direction, or, depending on the speed of rotation of the gear 112 and the speed of rotation of the column 16, held stationary.

The two lower gears of the epicyclic gear train on shaft 125' are separated by bronze washers 232 which cause the movable key 130 to disengage one gear before entering the next gear, said key having beveled surfaces, as at 231, for obvious purposes.

Blow head control mechanism

Vertical reciprocation of the chuck shaft and the opening and closing of the molds are controlled manually. The blowing air preferably is on continuously but may be controlled if desired. The mechanism for controlling the vertical reciprocation of the chuck shaft etc. is shown in Figures 4, 6 and 7 to 14 inclusive.

Said mechanism is manually controlled by a lever 170 and each blow head and associated mold has one of the aforesaid controls provided therefor. It is proposed that when the control is moved to one position, the operation of lowering the blow pipe on the previously pre-positioned end of the blow pipe and the closing of the separable mold shall ensue and that the parts shall remain in said position until the control is again actuated, regardless of how many revolutions may be made by the table. In other words, the blowing operation may continue for successive revolutions of the table on any one mold without interruption and likewise the mold may remain open when not in use and the blow pipe chuck elevated for successive revolutions of the table.

The control mechanism of Figure 6 is supported on the machine by means of a split clamp 140 enabling vertical adjustment thereof. The clamp is formed as part of a valve housing 141, Figures 9 and 10, having a longitudinal bore 142 in which a piston 143 works, and has cross bores 144, 145, 146, 147, 148 and 149 communicating therewith and a vent opening 150. Each cross bore is tapped and bore 142 is tapped at the upper end and a plug 151 screwed thereinto. The opposite end of the housing is externally threaded and a packing gland in the form of a perforated cap 152 and gasket 152a mounted thereon, said gasket encompassing the piston rod 153, and preventing leakage therearound. 154 is a plug provided with a stop pin 155 screwed into bore 147 and this pin limits the uppermost and lowermost point of travel of the piston 143, said piston being cut away to provide a ledge 156 and a ledge 156', Figure 6, for this purpose. 157, Figure 6, indicates a chamber by means of which bore 146 Fig. 7 communicates with bores 144, 145, 148 and 149, and vent 150 Figs. 9 and 10.

With reference to Figure 6, when piston 143 is in the position illustrated, communication is established between bores 148, 149 and bore 146 by means of groove 158 in the piston. The piston, Figure 8, has a vertical passage 159 therethrough having an inlet 160 which admits air to the chamber 163, Figure 7, said inlet being in groove 161. Another inlet 160a in groove 158 also admits air under pressure to the passage 159. Passage 159 communicates also with a chamber 163a therebelow, Figure 7.

Air under pressure enters passage 159 through either of the inlets depending on the position of the piston and due to the larger area of chamber 163 forces the piston downwardly, passage 159 acting as a vent permitting the displacement of air in chamber 163a into the upper chamber 163.

When the piston is in the position shown in Figure 7, bore 146 is in communication with bores 145 and 144 by virtue of groove 161 whilst bores 148 and 149 are vented due to the position of the segmental groove 149' in the piston. When the piston is in raised position, bores 144 and 145 are likewise vented. Further description of the operation of this mechanism will be made in connection with a description of the compressed air system.

The lower end of the piston rod has attached thereto a member 164 which is bifurcated and secured thereto by a cross pin 165. This member has a cross bore 166, Figure 12, in which is disposed a round pin 167, Figure 13, having a notch 168 formed in the underside thereof in which a lug 169 on the top end of a lever 170 fits. Lever 170 is pivotally connected to member 164 by pin 171, said member being bifurcated to receive the same. In the position shown in Figure 6, the right hand end of pin 167 is caught over the rim of the aperture in the cap 152, and this holds piston 143 in raised position. In order to release the pin and drop the piston down, thereby commencing a cycle of operations involving the lowering of the blow pipe chuck and closing the mold, the operator will in practise, rest the blow pipe on the rollers 78 at an angle to the vertical permitting the gather suspended from the lower end to settle toward the bottom of the mold. When in the operator's estimation the gather is sufficiently elongated the blow pipe is moved to a vertical position thereby aligning the upper end thereof with the blow pipe chuck. As the blow pipe is moved inwardly it engages and presses against crowned rollers 176 rotatably mounted on a plate 177 connected to a bolt secured to the lower end of lever 170 by a pin 178'. This tilts lever 170 to the right causing pin 167 to shift to the left out of engagement with the rim of the aperture and into registry with said aperture. Thereupon air under pressure in chamber 163 forces the piston downwardly. As the piston moves down the hand grip 172, Figure 6, is turned to the right. Said hand grip is formed as a part of mechanism for resetting the piston and is mounted on a shaft 172', Figure 14, suspended by bracket 173 clamped on rod 83. Also mounted on the shaft 172' is a bifurcated member 174 disposed at 90° to lever 172, both being secured on and rotatable with the shaft. The bifurcated member straddles lever 170.

When the blow pipe is to be released, the operator grasps the handle 172 and pulls outwardly thereon thereby forcing lever 170 to be elevated and raising the piston 143. This action results in the blow head chuck being raised thereby releasing the blow pipe, the mold being opened concurrently with the freeing of the blow pipe. Spring 179 assists in restoring the lever 170 to raised position and the action of the lug 169 and pin 167 is such that as the pin clears the rim of the aperture it is projected horizontally over the edge and again latches the piston 143 in up position. The tapers 180, Fig. 7, on either side of lug 169 limit the degree of tilt of the lever 170.

*The compressed air system*

With reference to Figures 1, 3, 18 and 24, mounted on the platform 7 at the lower left hand side of the machine base is a motor 10 having a belt drive 181 connected to the drive pulley 182 of a compressor 9. The compressor is of standard construction and has a pressure line 184, figure 24, leading to a tank 185, there being a by-pass line 186 having an unloader 187 therein. Leading from the tank is a pressure line 188 and this line branches into a high pressure line 189 supplying the blow head cylinders and the mold actuating cylinders with high pressure air. The other line 190 has a pressure reducing valve 191 therein and conducts low pressure air to the blow pipes.

Referring to Figure 3, the high and low pressure lines 189 and 190, respectively, are in the form of conduits which enter the hollow standard and extend upwardly therein into the reduced portion 116 where they connect into a stationary bushing 192, Figure 18. 193 is threaded bore into which the end of the conduit 190 is screwed the bore communicating with a passage 194 into which a pipe 195 is screwed leading to the lower chamber 199 of an air distributor 197 having an annular hub 197' encompassing and clamped on the hub 123 of the upper frame member supporting the epicyclic gear train. Said distributor has a horizontal wall 198 dividing the chamber into a high pressure compartment 196 and the previously mentioned low pressure compartment 199. The hub of the air distributor is internally threaded and a bushing 200 is screwed thereinto having a packing gland 201 surrounding pipe 195 to prevent loss of air pressure.

Leading from the lower compartment 199 are three supply lines 202, Figures 1, 4 and 25, each leading to a coupling 103 associated with a blow head by means of which blowing air is supplied thereto.

The high pressure conduit 189 is threaded into a bore 203 in bushing 192, Figure 18, communicating with a pipe 204 threaded into a bore in said bushing and projecting upwardly into the high pressure compartment of distributor 197 being gasketed where it passes through the dividing wall 198. 205 are supply lines leading from the high pressure compartment 199 to the couplings 206 screwed into bores 146 in each of the valve housings 141. The connections between each of the control valves and the blow head and chuck actuating cylinders are identical and therefore a description of one such hookup will suffice.

Referring to Figures 4, 9 and 10, a coupling 207 screwed into bore 145 is connected to line 108 which conducts air to the piston chamber above piston 91 in the blow head. 208 is a coupling screwed into bore 149 connected to line 110 conducting high pressure air nto the bottom of cylinder 86. 209 is a coupling screwed into bore 144 connected to line 210 leading to a T-connection 210', Figure 1, supported by a clamp ring 211 on column 16 from which branch pipes 212 and 213 lead respectively to the left and right hand cylinders 59 connected to the left and right hand mold sections of a cooperating pair of mold halves, said lines being connected to the rear of the cylinders so as to conduct air under pressure thereto for the forward or mold closing stroke of the pistons.

214, a coupling screwed into bore 148 connected to line 215 lead to a T-connection 216 which is also supported by clamp 211. Branch lines 217 and 218 lead to the opposite ends of cylinders 59 for conducting high pressure air thereto for moving the respective pistons. In order to vary the closing speed or time of the respective sections of a pair of mold sections, adjustable valves 219 may be interposed in the fluid lines 217 and 218 in either one or both and in lines 212 and 213. It is preferred that in actual operation that one mold section be moved to closed position in advance of the other. Various movements of the mold halves to suit any particular operating condition may be obtained through said valves.

The cooling system

It is desired to cool the molds by spraying cooling fluid thereinto and to recover the fluid and recirculate it. 220, Figures 2 and 5, is a pump driven off the reduction gearing in housing 26 by a worm in housing 221. The inlet side of the pump is connected with the fluid reservoir in the base of the machine by a line 222 and the outlet side of the pump is connected to a pipe 223 having a spray nozzle 223', Figure 1, located at the perimeter of the table and directed toward said molds, there being a valve 224 in said line for control purposes.

Sprayed fluid drains through the apertures in table 46 onto the surface of a collecting pan 53 superimposed on the base and supported on tops of webs 42. This pan, Figures 3 and 20, is constructed with a frusto-conical center section 53' and has a radial upstanding rib 225 which acts as a barrier to the flow of fluid connecting in the trough formed by the juncture of the frusto-conical section and the wide flaring brim flange 227. It is desired that the trough have about a 1° drop so that fluid will flow by gravity in the direction of the arrow into a drain hole 228 at the lowest point of the trough adjacent the rib and will drain therefrom into the compartment A above the radial rib 44, Figure 2, due to the position of the pan on the base. The fluid will pass slowly from compartment to compartment in the base through the communicating passages 45 and will be drawn off from compartment B by the pump, sediment settling out of the same during the progress. In this manner the fluid is caused to follow a circuitous path reversing itself once in the process and coming in contact with a large area of heat radiating surface so that by the time it is drawn into the pump again it will be appreciably cooled.

The operation

It will be understood that the machine is to be operated at a speed dictated by the practical requirements of production. For instance, on some classes of ware the speed may be as low as three per minute and on other classes of ware as high as twenty per minute or as high as the top speed of the machine will permit, all within practical limits of course.

Assuming that the machine is at rest with the parts in such position of adjustment that the blow pipe chucks are elevated as illustrated by the right hand chuck in Figure 1 and the mold sections are open, the operator first closes switches 229 and 230, Figure 2, thereby starting the compressor and commencing the rotation of table 46, spiders 72 and 20 and associated blow heads and chucks about the center column. It will be further assumed that the speed of the rotation of gear 112 is such as to rotate the chuck shafts 85 at the proper speed and with the exception of turning on valve 224 so as to spray fluid into the mold, the machine is ready to operate. It will be remembered that the blowing air is on continuously and therefore there is no need to valve it.

As a mold approaches the loading position, the operator places a blow pipe with a gather of glass depending from the lower end thereof on the rest formed by rollers 78, the pipe being held at an angle to the vertical and in line with the open end of bifurcated guide 231 Fig. 1. The table is in constant motion and the operator, when the gather has sagged sufficiently, pushes the blow pipe home between the guides thereby aligning the tip of the blow pipe with the chuck 105 and tripping lever 170. It is preferred that plate 177 have little movement relative to its support so that rollers 176 will align with the blow pipe.

When lever 170 is tripped, pin 167 is withdrawn and this permits air under pressure in chamber 163 to force piston 143 down whereupon compressed air is admitted to line 108 thereby causing piston 91 to descend, the air ahead of said piston being vented through line 110 and vent opening 150.

The chuck shaft, which is rotating all the while, descends and engages the hexagon end of the blow pipe thereby rotating the same. Blowing air is introduced into the pipe by the cooperation of the tip of the blow pipe with the aperture in the sealing ring 106.

Concurrently with the descent of the blow pipe chuck, compressed air is admitted to line 210 thereby forcing the pistons in cylinders 59 to close the mold sections. As the pistons move forwardly in cylinders 59, the air ahead of the pistons is forced out of the cylinders through lines 215 and out the vent 150.

The table continues to move all the while and, after having made one half revolution from the loading point, the mold approaches the unloading position where the assistant operator grasps the blow pipe in one hand and simultaneously pulls the lever 172 forward. Pulling the lever forward elevates piston 143 to the position shown in Figure 6. The pressure in lines 108 and 210 is released and both lines are automatically connected with the vent 150. Air under pressure enters lines 110 and 215 thereby causing piston 85 to be elevated which disengages the blow pipe from the chuck 105 and disconnects it from the source of blowing air concurrently with the opening of the mold halves. The operator removes the blow pipe with the completed ware thereon from the machine. The open mold continues in its orbit past the spray nozzle where it is treated with cooling fluid preparatory to receiving a fresh charge of material.

It is evident that the aforesaid machine is simple in construction, positive and effective in operation and embodies many novel features of construction and operation. A wide range of articles can be manufactured with the same and it is easily adjusted for different sizes and shapes of articles and does not require skilled workmen.

Although for the sake of clearness the embodiment of the principles of our invention shown in the drawings have been minutely described, various modifications will occur to those familiar with the art which are properly within the compass of this invention and therefore we do not wish to limit ourselves to the specific details herein described but claim broadly:

1. In a paste mold glass machine, a support, a blow head that moves in a circle about said support said blow head having a hollow rod therein for cooperation with a blow pipe, means for moving said blow head as aforesaid including a motor and a gear drive having an adjustable speed reducer, means for rotating said hollow rod comprising a gear operatively connected thereto and a duplex epicyclic gear train for driving said gear, said duplex epicyclic gear train being selectively adjustable to vary the speed of rotation of said gear, the means for moving said blow head being adapted to move the gears of the duplex epicyclic gear train having a translatory motion in a translatory path.

2. In a paste mold glass machine, a support, a blow head that moves in a circular path about said support, said blow head having a hollow rod therein for cooperation with a blow pipe, a drive gear for rotating said rod and means for rotating said drive gear or holding it stationary to thereby rotate the rod comprising a duplex epicyclic gear train having means for selectively changing speeds while the blow head is moving in said circular path.

3. In a paste mold glass machine, a support, a blow head that moves in a circular path about said support, said blow head having a hollow rod therein for cooperation with a blow pipe and means for rotating said rod comprising a driven gear and a duplex epicyclic gear train connected therewith wherein the gears having the motion of translation are moved in a translatory path with said blow head said last named gears being adapted to rotate the first named gear.

4. In a paste mold glass machine, a blow pipe a support, a blow head, means for moving said blow head about said support said blow head having a hollow rod therein adapted to be moved into and out of engagement with the blow pipe, means for rotating said rod comprising a driven gear, a duplex epicyclic gear train for driving said gear a driving connection between said driven gear and gear training and means for moving said hollow rod into and out of engagement with a blow pipe whilst the driving connection exists.

5. In a paste mold glass machine, a blow pipe, a standard, a column, means for rotating said column, a blow head connected to the column to rotate about said standard having a hollow rod therein adapted to be moved into and out of operative position with respect to the blow pipe means for rotating said blow head in the fashion specified and means for rotating said rod comprising a duplex epicyclic gear train, a gear operatively connected with said rod driven by said epicyclic train, means for selectively changing the speed of rotation of said last named gear and means for moving said rod into and out of engagement with a blow pipe.

6. In a paste mold glass machine, blow pipes, a support, a plurality of blow heads means to move said blow heads that move in a circular path about said support, said blow heads each having a hollow rod therein for cooperation with a blow pipe and means for rotating said hollow rods in unison comprising a driven gear common to and in driving connection with said rods together with a duplex epicyclic gear train having means for selectively changing speeds and in which the gears having a translatory motion are moved in a translatory path about said support with said blow heads.

7. In a paste mold glass machine, a support, a blow head, means for moving said blow head in a circular path about said support said blow head having an air operated piston therein and a hollow rod adapted to cooperate with a blow pipe supported by said piston, a source of air under pressure, a distributor having a high pressure chamber for supplying air to the blow head for actuating the piston and a low pressure chamber for supplying blowing air to the hollow rod, said distributor being rotatable relative to the support and disposed substantially on the axis of rotation of the blow head about said support.

8. In a paste mold glass machine, a support, a plurality of blow heads mounted, means for moving said blow heads in a circular path about said support each of said blow heads having an air operated piston therein and a hollow rod adapted to cooperate with a blow pipe supported by said piston, a source of air under pressure, a distributor in fluidic communication therewith common to all of said blow heads said distributor having a high pressure chamber for supplying air to the said blow heads for actuating the pistons thereof together with fluid lines communicating with the piston chambers having manually actuatable valves therein and a low pressure chamber for continuously supplying air to the hollow rods, said distributor being rotatable in its entirety relative to the support and disposed substantially on the axis of rotation of the blow heads about said support.

9. In a paste mold glass machine, a blow pipe, a blow head having a piston therein, a hollow rod supported by said piston and adapted to be moved into and out of engagement with the blow pipe thereby and means forming the support for said rod comprising an anti-friction roller bearing secured by means of the outer race thereof to the aforesaid piston.

10. In a paste mold glass machine, a blow pipe, a blow head having a piston therein said piston having a chamber therein sealed with respect to the piston chamber in which the piston moves, a hollow rod supported by said piston and having one end in communication with the chamber within the piston said rod being adapted to be moved by the piston into and out of cooperation with the blow pipe, a source of air under pressure communicating with the chamber within said piston and means forming a support for said hollow rod comprising an anti-friction bearing secured by the outer race thereof to the piston there being no mechanical connection between the hollow rod and the source of air under pressure.

11. In apparatus for the manufacture of glassware, a blow head having a piston therein said piston having a chamber therein sealed with respect to the piston chamber in which the piston moves, a hollow rotatable rod supported by said piston and having one end in communication with the chamber within the piston, said rod being arranged to be moved by the piston into and out of cooperation with the blow mold, a source of air under pressure communicating with the chamber within said piston and means forming a support for said hollow rod comprising an anti-friction bearing secured by the outer race thereof to the piston there being no mechanical connection between the hollow rod and the source of air under pressure and means for rotating said hollow rod.

12. In a paste mold glass machine, a blow pipe, a support, a blow head, a piston in said blow head, a hollow rod secured to said piston and adapted to be moved into and out of cooperation with the blow pipe by said piston, a source of compressed air for actuating said piston and a control therefor comprising a piston movable in one direction by air under pressure and in the other direction manually there being means for latching said piston in one position of adjustment comprising a pin slidable in a direction perpendicular to the direction of movement of the piston last mentioned.

13. In a paste mold glass machine, a blow head having an air operated piston therein and means for controlling the admission and discharge of air to the piston chamber comprising a housing having a control piston therein movoble in one direction by air under pressure and in the other direction manually, there being means for limiting the degree of travel of said piston and means for latching the same in one position of adjustment comprising a shiftable pin movable crosswise of the axis of the control piston.

14. In a paste mold glass machine, a support, a mold table having separable blow molds thereon, blow heads superimposed relative thereto each having a hollow rod therein, blow pipe rests, blow pipes, means for moving said rod into and out of cooperation with the blow pipe associated with each respective blow head and blow mold, the connection between said blow pipe and said hollow rod being such that there is no mechanical pressure exerted on the blow pipe thereby when the blow pipe is on the rest and supported by the rod, means for supplying air under pressure to the hollow rod and means for rotating said rod.

15. In an organized paste mold machine for manufacturing articles of glassware, the combination which comprises a base having a vertical support mounted thereon, a mold table mounted on said support said mold table being rotatable and having separable blow molds mounted thereon, blow heads superimposed relative to said blow molds, blow pipes, said machine including a self-contained liquid circulating and cooling system for spraying the molds, a self-contained compressed air system for actuating the blow heads and opening and closing the molds having a single control actuatable upon the placing of the blow pipe in blowing position and by the said blow pipe and means for rotating the blow pipes comprising a duplex epicyclic gear train.

FREDERICK WILLIAM STEWART.
MATTHEW JAMES KELLY.
ASHLEY J. REEK.